United States Patent
Saigusa

(10) Patent No.: US 11,926,968 B2
(45) Date of Patent: Mar. 12, 2024

(54) METHOD FOR PRODUCING PAPER

(71) Applicant: KURITA WATER INDUSTRIES LTD., Tokyo (JP)

(72) Inventor: Takashi Saigusa, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 628 days.

(21) Appl. No.: 17/252,732

(22) PCT Filed: Apr. 11, 2019

(86) PCT No.: PCT/JP2019/015787
§ 371 (c)(1),
(2) Date: Dec. 16, 2020

(87) PCT Pub. No.: WO2019/244454
PCT Pub. Date: Dec. 26, 2019

(65) Prior Publication Data
US 2021/0214895 A1    Jul. 15, 2021

(30) Foreign Application Priority Data
Jun. 18, 2018 (JP) ............................... 2018-115278

(51) Int. Cl.
| | | |
|---|---|---|
| *D21H 21/04* | (2006.01) | |
| *B01D 21/01* | (2006.01) | |
| *C02F 1/50* | (2023.01) | |
| *C02F 1/56* | (2023.01) | |
| *D21H 17/28* | (2006.01) | |
| *D21H 17/53* | (2006.01) | |
| *D21H 23/04* | (2006.01) | |
| *C02F 101/34* | (2006.01) | |
| *C02F 103/28* | (2006.01) | |

(52) U.S. Cl.
CPC ............ *D21H 21/04* (2013.01); *B01D 21/01* (2013.01); *C02F 1/50* (2013.01); *C02F 1/56* (2013.01); *D21H 17/28* (2013.01); *D21H 17/53* (2013.01); *D21H 23/04* (2013.01); *C02F 2101/34* (2013.01); *C02F 2103/28* (2013.01); *C02F 2303/04* (2013.01)

(58) Field of Classification Search
CPC ........ D21H 21/04; D21H 17/28; D21H 17/53; D21H 23/04; B01D 21/01; C02F 1/50; C02F 1/56
USPC ....................................................... 162/168.3
See application file for complete search history.

(56) References Cited

U.S. PATENT DOCUMENTS

| | | | |
|---|---|---|---|
| 4,144,123 A | 3/1979 | Scharf et al. | |
| 5,126,014 A | 6/1992 | Chung | |
| 5,173,208 A | 12/1992 | Chung et al. | |
| 6,616,807 B1 | 9/2003 | Dyllick-Brenzinger et al. | |
| 2013/0186584 A1 | 7/2013 | Krapsch et al. | |
| 2017/0009100 A1* | 1/2017 | Ling | C09D 171/02 |

FOREIGN PATENT DOCUMENTS

| | | |
|---|---|---|
| DE | 2434816 | 5/1980 |
| EP | 1479703 | 11/2004 |
| JP | S5184895 | 7/1976 |
| JP | H10219590 | 8/1998 |
| JP | 2001518988 | 10/2001 |
| JP | 2010229571 | 10/2010 |
| JP | 2013538299 | 10/2013 |
| KR | 20060028783 | 4/2006 |
| WO | 2005004812 | 1/2005 |
| WO | 2012043256 | 4/2012 |
| WO | 2014115192 | 7/2014 |

OTHER PUBLICATIONS

Office Action of China Counterpart Application, dated Apr. 14, 2021, pp. 1-7.
Office Action of Korean Counterpart Application, dated May 6, 2021, pp. 1-4.
"Search Report of Europe Counterpart Application", dated Jun. 17, 2021, pp. 1-5.
"Notice of Reasons for Rejection issued to Japan Application No. 2018-115278," dated Jul. 9, 2019, with English translation thereof, pp. 1-6.
"International Search Report (Form PCT/ISA/210) of PCT/JP2019/015787," dated Jul. 16, 2019, with English translation thereof, pp. 1-4.

* cited by examiner

*Primary Examiner* — Mark Halpern
(74) *Attorney, Agent, or Firm* — JCIPRNET

(57) ABSTRACT

Provided is a method for producing paper that enables to fix an increased amount of starch components contained in papermaking process water to a papermaking raw material (suspended solid: SS) contained in the papermaking process water, and enables (1) enhancement of the strength of paper, (2) reduction in the contamination of the papermaking process water by microorganisms, etc., (3) suppression of the foaming of the papermaking process water, (4) decrease in the load of the waste water treatment, etc. The method comprises a step of adding a polymer having a polyalkylene oxide moiety to papermaking process water containing SS containing a papermaking raw material and unfixed starch. At this time, the concentration of SS contained in the papermaking process water is 100 mg/L or more, the concentration of the unfixed starch is 10 mg/L or more, and the salt viscosity of the polymer is 3 mPa·s or more.

2 Claims, No Drawings

METHOD FOR PRODUCING PAPER

CROSS-REFERENCE TO RELATED APPLICATION

This application is a 371 application of an international PCT application serial no. PCT/JP2019/015787, filed on Apr. 11, 2019, which claims the priority benefit of Japan application JP2018-115278, filed on Jun. 18, 2018. The entirety of the above-mentioned patent application is hereby incorporated by reference herein and made a part of this specification.

TECHNICAL FIELD

The present invention relates to a method for producing paper.

BACKGROUND ART

When paper or paperboard is produced, starch is added to, sprayed onto, and applied onto raw materials to enhance the strength of the paper or paperboard to be obtained. In addition, when the paper or paperboard is processed, starch is used as an adhesive.

By the way, the production of paper by recycling of waste paper or used paper is frequently performed in recent years. The recycling of waste paper or used paper is performed by disintegration of the waste paper or used paper, and disintegration causes starch components contained in the waste paper or used paper to elute into water.

Almost all of the starch components eluted into water are fixed on papermaking raw materials such as pulp or filler and used for an original purpose such as for enhancing the strength of a product. On the other hand, other starch components remain dissolved in papermaking process water.

The eluted starch becomes a nutrient source of microorganisms, which causes foul odor due to decomposition or generation of slime. The dissolved starch causes problems such as foaming or an increase in a load of waste water treatment.

To solve these problems, various measures have been attempted to fix as much starch dissolved in the papermaking process water as possible on the papermaking raw material (suspended solid: SS) contained in the papermaking process water by using a chemical agent and to reduce the amount of starch dissolved in the papermaking process water after the fixation as possible.

For example, Patent Document 1 suggests conducting a step of adding substantially water-insoluble organic fine particles comprising a cationic functional group, an anionic functional group, or a functional group having hydrogen bonding ability to paper manufacturing process water, and a step of adding one or more selected from an inorganic coagulant, an organic coagulant, and an organic polymer flocculant to the paper manufacturing process water after addition of the organic fine particles.

For example, Patent Document 2 suggests conducting a step of adding a polymer having a predetermined cationic functional group to paper manufacturing process water.

CITATION LIST

Patent Document

Patent Document 1: Japanese Patent Laid-Open No. 2010-229571
Patent Document 2: International Publication No. WO 2012/043256

DISCLOSURE OF THE INVENTION

Problems to be Solved by the Invention

However, means described in Patent Documents 1 and 2 are both a means for physically adsorbing the starch component dissolved in the papermaking process water to suspended solid (SS) particles. According to this means, the amount of starch adsorbed relative to the suspended solid (SS) particles is limited. In addition, since almost all of the starch dissolved in the papermaking process water is nonionic or weakly anionic and the proportion of the starch that can be reacted with a cationic chemical agent is small, problems in practical use still remain.

In recent years, the blend ratio of waste paper or used paper as raw materials is more and more increasing as resource saving measures, and there is a trend toward so-called closed papermaking process in which no waste water is allowed to escape into the outside of the process to suppress the amount of waste water. Due to these increase in the blend ratio of used paper, closed papermaking process, and the like, it is expected that the concentration of the starch which remains eluted in the papermaking process water and the problems described above are further increased than ever before.

The present invention has been made in view of such problems, and the objects of the present invention are to enable to fix an increased amount of starch components contained in the papermaking process water on the papermaking raw material (suspended solid: SS) contained in the papermaking process water, and to provide a method for producing paper that enables (1) enhancement of the strength of paper, (2) reduction in the contamination of the papermaking process water by microorganisms and the like, (3) suppression of the foaming of the papermaking process water, (4) decrease in the load of the waste water treatment, and the like.

Means for Solving the Problems

The present inventors have conducted extensive studies to accomplish the above objects and as a result, have found that the above problems can be solved by insolubilizing the starch contained in the papermaking process water and then fixing the insolubilized starch on the papermaking raw material, and have completed the present invention.

To date, attempts have been made to fix a chemical agent on a predetermined substance contained in the papermaking process water. The chemical agent is cationic or anionic and the fixation of the chemical agent in the papermaking process generally utilizes ionic bonds formed between a cationic substance and an anionic substance. However, the dissolved starch dissolved in the papermaking process water is nonionic or weakly anionic, and it is difficult to form ionic bonds between the dissolved starch and the papermaking raw material (suspended solid: SS) to insolubilize the dissolved starch by the ionic bonds. Therefore, insolubilization of the dissolved starch requires to be performed by a different approach from the ionic bond and it is not easy to achieve insolubilization of the dissolved starch in the papermaking process.

Specifically, the present invention provides the followings.

(1) The present invention is a method for producing paper comprising a step of adding a polymer having a polyalkylene oxide moiety to papermaking process water containing a suspended solid containing a papermaking raw material and unfixed starch, wherein a concentration of the suspended solid contained in the papermaking process water is 100 mg/L or more, a concentration of the unfixed starch contained in the papermaking process water is 10 mg/L or more, and a salt viscosity of the polymer measured by the following method is 3 mPa·s or more.

<Method for Measuring Salt Viscosity>

The viscosity of an aqueous solution containing 4% by weight of common salt and 0.5% by weight of the polymer is measured under the conditions of 25° C. and a rotor rotating speed of 60 rpm. The viscosity measurement method is based on JIS K 7117-2.

(2) In addition, the present invention is a method for producing paper according to (1) comprising a step of adding a slime control agent to the papermaking process water.

Effects of the Invention

According to the present invention, the unfixed starch can be insolubilized by binding the unfixed starch contained in the papermaking process water on the polyalkylene oxide moiety contained in the polymer. This insolubilization is a different approach from the ionic bond and expected to be caused by the association of molecules through hydrogen bonding of the hydroxyl group.

Insolubilization of the unfixed starch allows to fix the insolubilized starch more efficiently on the papermaking raw material (suspended solid: SS) such as pulp, filler, and the like.

Consequently, the present invention can achieve the advantageous effects shown in the following (1) to (6) at once.

(1) Enhancement in Paper Strength

First, the starch fixed on the papermaking raw material (suspended solid: SS) such as pulp, filler, and the like and cellulose fiber constituting the papermaking raw material are bonded through hydrogen bonding, which can increase the strength of paper (paper strength) as a product. Accordingly, reduction in paper weight, use of an inexpensive material, and reduction of the paper strengthening agent are enabled.

(2) Enhancement of Yield

Second, in a wire part in which the papermaking process water is placed on a wire (mesh) to leave the papermaking raw material (suspended solid: SS) contained in the papermaking process water on the wire (mesh) and drop water components under the wire (mesh), agglomeration of the papermaking raw material (suspended solid: SS) accompanied by insolubilization of the starch enables to capture an increased amount of papermaking raw materials (suspended solid: SS) on the wire and increase the yield of a product.

(3) Improvement in Fixation of Internal Agents Such as Sizing Agents and Dyes

Third, agglomeration of the papermaking raw material (suspended solid: SS) accompanying insolubilization of the starch enables to fix various chemical agents such as sizing agents which prevent penetration of water into a paper product and bleeding of ink and dyes which impart colors to a paper product on the papermaking raw material more efficiently, which can result in a reduction of various chemical agents such as sizing agents and dyes.

(4) Reduction in Contamination

Forth, since the concentration of the starch dissolved in the papermaking process water can be suppressed, the amount of the nutrient source of microorganisms is decreased and the generation of slime can be suppressed. Since the concentration of the starch remained in the water after the papermaking process and the concentration of the chemical agent can be suppressed and the contamination of the water after the papermaking process can be suppressed, a reduction in the number of cleaning, an extension of the continuous operation time, and the like are enabled.

(5) Foam Suppression

Fifth, foaming of the papermaking process water caused by the starch dissolved in the papermaking process water can be suppressed, and not only contamination of a product (paper) and disadvantages caused by foaming scum can be suppressed, but also the amount of web breaks can be decreased. The amount of defoaming agent to be used for preventing the foaming scum can also be reduced.

(6) Reduction in Load of Waste Water

Sixth, the concentration of the starch, the papermaking raw material (suspended solid: SS), the chemical agent, and other dissolved organic matters in the waste water discharged from the papermaking process can be suppressed. Consequently, decrease in the load of the waste water treatment and reduction in the amount of chemical agent to be used for the waste water treatment are enabled.

PREFERRED MODE FOR CARRYING OUT THE INVENTION

Hereinafter, specific embodiments of the present invention will be described in detail, but the present invention is not limited to the following embodiments in any way, and may be modified appropriately and implemented within the scope of the present invention.

<Method for Producing Paper>

The method for producing paper in the present embodiment comprises a step of adding a polymer having a polyalkylene oxide moiety to papermaking process water.

[Papermaking Process Water]

The papermaking process water contains a suspended solid (SS) containing a papermaking raw material and unfixed starch. The papermaking process water is not limited as long as it is paper manufacturing process water containing the suspended solid (SS) and the unfixed starch, and may be any of raw material slurry, slurry after diluting with white water, white water, filtrates of a dehydrator or a washer, white water-collected and treated water, waste water, disintegrated and collected raw materials, or the like.

[Suspended Solid (SS)]

The suspended solid (SS) contains papermaking raw materials such as pulp fibers, chemical fibers, fillers, and pigments.

The lower limit of the concentration of the suspended solid contained in the papermaking process water is 0.1 g/L or more, preferably 0.2 g/L or more, more preferably 0.5 g/L or more, and further preferably 1 g/L or more. When the concentration of the suspended solid is too low, the amount of the suspended solid which is a fixed object of the insolubilized starch is insufficient even by insolubilizing the unfixed starch contained in the papermaking process water by the polymer having a polyalkylene oxide moiety, and a suitable yield of paper as a product may not be obtained.

The upper limit of the concentration of the suspended solid contained in the papermaking process water is not particularly limited, but the upper limit of the concentration of suspended solid is preferably 200 g/L or less, more preferably 100 g/L or less, and further preferably 50 g/L or less, in consideration of the stability in a production line.

In the present embodiment, the concentration of the suspended solid contained in the papermaking process water is measured in accordance with JIS P 8225.

[Unfixed Starch]

In the present embodiment, the unfixed starch refers to, in the starch contained in the papermaking process water, the starch which is in a stage before fixing on the papermaking raw material (suspended solid: SS).

The lower limit of the concentration of the unfixed starch contained in the papermaking process water is 10 mg/L or more, preferably 50 mg/L or more, more preferably 100 mg/L or more, and further preferably 500 mg/L or less. When the concentration of the unfixed starch is too low, the amount of the insolubilized starch obtained by bonding with the polyalkylene oxide moiety contained in the polymer to be added to the papermaking process water is small and the insolubilized starch cannot be fixed on the papermaking raw material sufficiently so that the effects such as (1) enhancement of the strength of paper, (2) reduction in the contamination of the papermaking process water by microorganisms and the like, (3) suppression of the foaming of the papermaking process water, and (4) decrease in the load of the waste water treatment cannot be sufficiently obtained, which is not preferable.

The upper limit of the concentration of the unfixed starch contained in the papermaking process water is not particularly limited, and when the amount of the starch insolubilized by reacting with the polymer having a polyalkylene oxide moiety is too much relative to the amount of the suspended solid to be a fixed object, the starch remains dispersed in the papermaking process water without being fixed.

In the present embodiment, the concentration of the unfixed starch is measured by the following method. After the filtrate obtained by filtrating the papermaking process water through a 5A filter paper is diluted 2 to 20 times by volume using 10 times diluted hydrochloric acid, 5.26% by volume of 0.002 N iodine solution is added relative to 100% by volume of the filtrate and the absorbance at 580 nm is measured by a spectrophotometer. Then, the measured value is fitted to the calibration curve prepared using the starch of special grade reagent manufactured by KISHIDA CHEMICAL Co., Ltd. in advance to obtain the concentration of the unfixed starch.

[Polymer having Polyalkylene Oxide Moiety: Starch Insolubilizing Agent]

The present embodiment comprises a step of adding the polymer having a polyalkylene oxide moiety to the papermaking process water described above. This polymer has a function to insolubilize the unfixed starch contained in the papermaking process water.

The polyalkylene oxide moiety contained in the polymer is reacted with the unfixed starch contained in the papermaking process water to insolubilize the unfixed starch. Insolubilization of the unfixed starch is assumed to be caused by the association of molecules through hydrogen bonding of the hydroxyl group.

In the present embodiment, examples of the form of the insolubilized matter of the unfixed starch (hereinafter also referred to as "insolubilized starch") are not limited to complete insolubilized matters having a hard, particulate form, but include jelly-like or high viscous liquid aspects.

In the present embodiment, the polyalkylene oxide moiety is not particularly limited as long as it has a structure of polyalkylene oxide such as polyethylene oxide, polypropylene oxide, and polybutylene oxide. The polyalkylene oxide moiety has a polyether structure having, as a repeat unit, a constitutional unit obtained by polymerizing alkylene oxide. The alkylene oxides may be used singly or in combination of a plurality of kinds thereof, and the arrangement thereof may be in either random structure or block structure. The structure of the polymer may be a structure having the polyalkylene oxide moiety as the main chain or may be a structure in which the polyalkylene oxide moiety is added as a side chain to any polymer main chain.

The lower limit of the salt viscosity of the polymer having a polyalkylene oxide moiety is 3 mPa·s or more, preferably 5 mPa·s or more, more preferably 10 mPa·s or more, further preferably 50 mPa·s or more, still further preferably 100 mPa·s or more, and particularly preferably 200 mPa·s or more. When the salt viscosity of the polymer is too low, the insolubilized starch may not be suitably fixed to the suspended solid even by insolubilizing the unfixed starch contained in the papermaking process water with the polymer having a polyalkylene oxide moiety.

The upper limit of the salt viscosity of the polymer having a polyalkylene oxide moiety is not particularly limited, but the upper limit of the salt viscosity is preferably 2,000 mPa·s or less, more preferably 1,000 mPa·s or less, and further preferably 500 mPa·s or less to prevent water solubility into the papermaking process water or handleability of the polymer from being adversely affected.

In the present embodiment, measurement of the salt concentration is performed by the following means.

The viscosity of an aqueous solution containing 4% by weight of common salt and 0.5% by weight of the polymer is measured under the conditions of 25° C. and a rotor rotating speed of 60 rpm. The viscosity measurement method is based on JIS K 7117-2.

The number of carbon atoms in the polyalkylene moiety in the constitutional unit corresponding to the polyalkylene oxide is not particularly limited. Above all, since the water solubility into the papermaking process water is high and the handling of the polymer is easy, the lower limit of the number of carbon atoms is preferably 2 or more, and the upper limit of the number of carbon atoms is preferably 12 or less, more preferably 6 or less, further preferably 4 or less, and particularly preferably 3 or less.

The lower limit of the proportion of the polyalkylene oxide moiety contained in the polymer that constitutes the starch insolubilizing agent is preferably 5% by weight or more, more preferably 10% by weight or more, further preferably 30% by weight or more, and particularly preferably 50% by weight or more relative to the total polymer.

The upper limit of the proportion is not particularly limited as long as the salt viscosity of the polymer is within a suitable range, and the proportion of the polyalkylene oxide moiety contained in the polymer that constitutes the starch insolubilizing agent may be 100% by weight relative to the total polymer.

Among the functional groups constituting the polymer, the moiety other than the polyalkylene oxide moiety may be either a synthetic product or a natural product. Since the hydrogen bonding of the polyalkylene oxide moiety is not inhibited by hydrogen bonding of ionic bonds or other functional groups, the moiety other than the polyalkylene oxide moiety may be any of cationic, anionic, amphoteric, or nonionic.

By the way, in a wire part in which the papermaking process water is placed to a wire (mesh) to leave the papermaking raw material (suspended solid: SS) contained in the papermaking process water on the wire (mesh) and drop water components under the wire (mesh), agglomeration of the papermaking raw material (suspended solid: SS) accompanying insolubilization of the starch enables to capture more papermaking raw materials (suspended solid: SS) on the wire and increase the yield of a product. The timing to add the polymer to the papermaking process water is not particularly limited, but it is preferably in the former stage before the papermaking process water reaches the wire part to exert the effect of enhancing the yield more significantly. When it is intended to fix not only the insolubilized starch, but also additives added to the papermaking process water on the papermaking raw material (suspended solid: SS), the polymer is preferably added immediately after the timing at which the additives are added to the papermaking process water.

The amount of the polymer added is not particularly limited. Typically, the polymer is added within a range of 0.1 mg or more and 100 mg or less per 1 L of the papermaking process water. Alternatively, it is added within a range of 10 g or more and 10,000 g or less per 1 t of the suspended solid (SS). Alternatively, it is added within a range of $1/1000$ times or more and 10 times or less by weight ratio relative to the unfixed starch.

[Other Additives]

To increase fixing properties of the insolubilized starch to the papermaking raw material (suspended solid: SS), conventionally known flocculants and coagulants may be used.

In addition, a slime control agent that suppresses the action of microorganisms in the papermaking process water may also be used in combination. Consequently, the amount of starch decomposed by microorganisms can be reduced and the unfixed starch can be efficiently utilized.

[Effects of Using Above Polymer: Starch Insolubilizing Agent]

The present embodiment can achieve the advantageous effects shown in the following (1) to (6) at once by using the above polymer: starch insolubilizing agent.

(1) Enhancement in Paper Strength

First, the starch fixed on the papermaking raw material (suspended solid: SS) such as pulp, filler, and the like and cellulose fiber constituting the papermaking raw material are bonded through hydrogen bonding, which can increase the strength of paper (paper strength) as a product. Accordingly, reduction in paper weight, use of an inexpensive material, and reduction of the paper strengthening agent are enabled.

(2) Enhancement of Yield

Second, in a wire part in which the papermaking process water is placed on a wire (mesh) to leave the papermaking raw material (suspended solid: SS) contained in the papermaking process water on the wire (mesh) and drop water components under the wire (mesh), agglomeration of the papermaking raw material (suspended solid: SS) accompanied by insolubilization of the starch enables to capture an increased amount of papermaking raw materials (suspended solid: SS) on the wire and increase the yield of a product.

(3) Improvement in Fixation of Internal Agents Such as Sizing Agents and Dyes

Third, agglomeration of the papermaking raw material (suspended solid: SS) accompanying insolubilization of the starch enables to fix various chemical agents such as sizing agents which prevent penetration of water into a paper product and bleeding of ink and dyes which impart colors to a paper product on the papermaking raw material more efficiently, which can result in a reduction of various chemical agents such as sizing agents and dyes.

(4) Reduction in Contamination

Forth, since the concentration of the starch dissolved in the papermaking process water can be suppressed, the amount of the nutrient source of microorganisms is decreased and the generation of slime can be suppressed. Since the concentration of the starch remained in the water after the papermaking process and the concentration of the chemical agent can be suppressed and the contamination of the water after the papermaking process can be suppressed, a reduction in the number of cleaning, an extension of the continuous operation time, and the like are enabled.

(5) Foam Suppression

Fifth, foaming of the papermaking process water caused by the starch dissolved in the papermaking process water can be suppressed, and not only contamination of a product (paper) and disadvantages caused by foaming scum can be suppressed, but also the amount of web breaks can be decreased. The amount of defoaming agent to be used for preventing the foaming scum can also be reduced.

(6) Reduction in Load of Waste Water

Sixth, the concentration of the starch, the papermaking raw material (suspended solid: SS), the chemical agent, and other dissolved organic matters in the waste water discharged from the papermaking process can be suppressed. Consequently, decrease in the load of the waste water treatment and reduction in the amount of chemical agent to be used for the waste water treatment are enabled.

EXAMPLES

Hereinafter, the present invention will be specifically described with reference to the Examples, but the present invention is not limited thereto.

<Test Example 1> Relation Between Chemical Structure of Polymer Added to Papermaking Process Water and Fixing Properties of Unfixed Starch on Suspended Solid (SS)

While stirring a slurry having 1% by absolute dry weight of hardwood kraft pulp (LBKP) that was refined to 415 mL Canadian Standard Freeness (CSF), starch and a starch insolubilizing agent were sequentially added thereto. As the starch, 1000 mg/L of the starch obtained by cooking 2% corn starch under the conditions of 95° C. and pH 12 was added as a solid relative to the slurry. As the starch insolubilizing agent, among polymer A to J showing the physical properties shown in Table 1, the polymers of the types shown in Table 2 were added in the amount shown in Table 2 relative to the amount of slurry.

The amount of unfixed starch contained in the slurry after the starch and the starch insolubilizing agent were added was measured. The concentration of the unfixed starch was measured by the following method. After the filtrate obtained by filtrating papermaking process water through a 5A filter paper was diluted 2 to 20 times by volume ratio using 10 times diluted hydrochloric acid, 5.26% by volume of 0.002 N iodine solution was added relative to 100% by volume of the filtrate and the absorbance at 580 nm was measured by a spectrophotometer. Then, the measured value was fitted to the calibration curve prepared using the starch of special grade reagent manufactured by KISHIDA CHEMICAL Co., Ltd. in advance to obtain the concentration of the unfixed starch. Measurement results of the amount of the unfixed starch are shown in Table 2.

In addition, the slurry after the starch and the starch insolubilizing agent were added was used to prepare a handsheet having a basis weight of 170 g/m² that was adjusted according to the method defined in JIS P 8029, and the compressive strength thereof was measured by the method defined in JIS P 8156. Measurement results are shown in Table 2.

As shown in Table 2, in Examples 1 to 8 in which a polymer having a polyalkylene oxide moiety was used, the unfixed starch concentration of the slurry after adjustment was low and the specific compression strength of the handsheet prepared by using the slurry after adjustment was high as compared with those in Comparative Examples 1 to 6.

On the other hand, under the conditions of not adding the starch of Comparative Examples 9 to 16, the specific compression strength was not increased even by adding the polymer having a polyalkylene oxide moiety. The polymer having a polyalkylene oxide moiety has an excellent function of fixing the starch and is considered to increase the strength of paper by fixing the starch on the papermaking raw material (suspended solid: SS).

TABLE 1

| Type of polymer | Constituent ratio in molecule (% by mole) | | | | | Salt viscosity (mPa · s) | Reference |
| | Acrylamide | Acrylic acid | Ethylene oxide addition moiety | Propylene oxide addition moiety | Quaternized dimethylaminoethyl acrylate | | |
| --- | --- | --- | --- | --- | --- | --- | --- |
| Polymer A | 85 | 0 | 15 | 0 | 0 | 92 | Present Example |
| Polymer B | 52 | 31 | 17 | 0 | 0 | 124 | |
| Polymer C | 54 | 33 | 0 | 13 | 0 | 115 | |
| Polymer D | 0 | 0 | 100 | 0 | 0 | 202 | |
| Polymer E | 0 | 0 | 100 | 0 | 0 | 12 | |
| Polymer F | 0 | 0 | 100 | 0 | 0 | 5.2 | |
| Polymer G | 0 | 0 | 100 | 0 | 0 | 1.9 | Comparative Example |
| Polymer H | 0 | 0 | 100 | 0 | 0 | 0.96 | |
| Polymer I | 100 | 0 | 0 | 0 | 0 | 94 | |
| Polymer J | 54 | 0 | 0 | 0 | 46 | 6.1 | |

In Table 1, the salt concentration is the value measured by the following means.

The viscosity of an aqueous solution containing 4% by weight of common salt and 0.5% by weight of the polymer is measured under the conditions of 25° C. and a rotor rotating speed of 60 rpm. The viscosity measurement method is based on JIS K 7117-2.

TABLE 2

| | Amount of starch added (mg/L relative to slurry) | Polymer | | Unfixed starch concentration (mg/L) | Specific compression strength (kNm/kg) |
| | | Type | Amount added (g/t relative to SS) | | |
| --- | --- | --- | --- | --- | --- |
| Blank 1 | 1000 | No addition | | 810 | 1.68 |
| Example 1 | 1000 | Polymer A | 800 | 652 | 1.84 |
| Example 2 | 1000 | Polymer B | 800 | 681 | 1.82 |
| Example 3 | 1000 | Polymer C | 800 | 667 | 1.83 |
| Example 4 | 1000 | Polymer D | 200 | 700 | 1.88 |
| Example 5 | 1000 | Polymer D | 400 | 664 | 1.89 |
| Example 6 | 1000 | Polymer D | 800 | 621 | 1.81 |
| Example 7 | 1000 | Polymer E | 800 | 681 | 1.92 |
| Example 8 | 1000 | Polymer F | 800 | 722 | 1.82 |
| Comparative Example 1 | 1000 | Polymer G | 800 | 773 | 1.74 |
| Comparative Example 2 | 1000 | Polymer H | 800 | 792 | 1.69 |
| Comparative Example 3 | 1000 | Polymer I | 800 | 808 | 1.68 |
| Comparative Example 4 | 1000 | Polymer J | 200 | 773 | 1.69 |
| Comparative Example 5 | 1000 | Polymer J | 400 | 766 | 1.78 |
| Comparative Example 6 | 1000 | Polymer J | 800 | 758 | 1.77 |
| Blank 2 | 0 | No addition | | 0 | 1.45 |
| Comparative Example 9 | 0 | Polymer A | 800 | 0 | 1.42 |
| Comparative Example 10 | 0 | Polymer B | 800 | 0 | 1.41 |
| Comparative Example 11 | 0 | Polymer C | 800 | 0 | 1.46 |
| Comparative Example 12 | 0 | Polymer D | 200 | 0 | 1.44 |
| Comparative Example 13 | 0 | Polymer D | 400 | 0 | 1.42 |
| Comparative Example 14 | 0 | Polymer D | 800 | 0 | 1.45 |
| Comparative Example 15 | 0 | Polymer E | 800 | 0 | 1.46 |
| Comparative Example 16 | 0 | Polymer F | 800 | 0 | 1.41 |

<Test Example 2> Relation Between Chemical Structure of Polymer to be Added to Papermaking Process Water and Yield of Suspended Solid (SS) as Well as Extent of Clarification of Water After Papermaking While stirring a slurry obtained by adding a slurry having 67% by weight of light calcium carbonate (TamaPearl TP121, manufactured by OKUTAMA KOGYO CO., LTD.) relative to the pulp to a slurry having 0.6% by absolute dry weight of hardwood kraft pulp (LBKP) refined to 415 mL Canadian Standard Freeness (CSF), starch and a starch insolubilizing agent were sequentially added thereto. The same starch as in Test Example 1 was used. As the starch insolubilizing agent, among polymer A to J showing the physical properties shown in Table 1, the polymers of the types shown in Table 3 were added in the amount shown in Table 3 as the amount relative to SS.

The yield test was performed for samples after the sequential addition of the starch and the starch insolubilizing agent. In the yield test, the yield testing apparatus DFS (dynamic filtration system, manufactured by Mutek) was used. A method recommended by Mutek was used as the setting conditions of DFS. The results are shown in Table 3.

The clarification test was performed for samples after the sequential addition of the starch and the starch insolubilizing agent. The clarification test was performed by measuring the turbidity of the filtrate obtained by filtrating samples with a #41 filter paper manufactured by Whatman. The results are shown in Table 3.

As shown in Table 3, in Examples 10 to 16 using the polymer having a polyalkylene oxide moiety, the suspended solid (SS) and the ash yield ratio were high and the turbidity of the filtrate was low as compared with those in Comparative Examples 7 to 12.

Under the conditions of not adding the starch of Comparative Examples 23 to 30, the range of increase of the yield ratio and the range of decrease of the filtrate turbidity were significantly small as compared with the blanks even by adding the polymer having a polyalkylene oxide moiety. This is expected that pulp fiber and fine dispersion are aggregated along with insolubilization of the starch due to the polymer having a polyalkylene oxide moiety, so that the effects of yield and fixation were observed.

<Test Example 3> Relation Between Amount of Starch to be Added to Slurry and Yield of Suspended Solid (SS) as Well as Extent of Clarification of Water after Papermaking Starch and a starch insolubilizing agent were sequentially added to a slurry containing hardwood kraft pulp (LBKP) and light calcium carbonate in a similar manner as Test Example 2. As the starch, the same starch as in Test Example 1 was added in the amount shown in Table 4 relative to the amount of slurry. As the starch insolubilizing agent, polymer A shown in Table 1 was added in the amount shown in Table 4 relative to the amount of SS.

The yield test and the clarification test were performed in a similar manner as in Test Example 2 for samples after the sequential addition of the starch and the starch insolubilizing agent. The results are shown in Table 4.

TABLE 3

| | Amount of starch added (mg/L relative to slurry) | Polymer Type | Polymer Amount added (g/t relative to SS) | SS yield ratio (%) | Ash yield ratio (%) | Filtrate turbidity (NTU) |
|---|---|---|---|---|---|---|
| Blank 3 | 1000 | No addition | | 63.5 | 27.3 | 5387 |
| Example 9 | 1000 | Polymer A | 800 | 88.2 | 78.6 | 35 |
| Example 10 | 1000 | Polymer B | 800 | 90.3 | 83.1 | 12 |
| Example 11 | 1000 | Polymer C | 800 | 86.8 | 74.8 | 25 |
| Example 12 | 1000 | Polymer D | 200 | 87.0 | 76.3 | 45 |
| Example 13 | 1000 | Polymer D | 400 | 89.3 | 80.0 | 11 |
| Example 14 | 1000 | Polymer D | 800 | 91.3 | 85.0 | 5 |
| Example 15 | 1000 | Polymer E | 800 | 82.5 | 67.3 | 55 |
| Example 16 | 1000 | Polymer F | 800 | 78.8 | 60.0 | 125 |
| Comparative Example 17 | 1000 | Polymer G | 800 | 69.2 | 40.2 | 1296 |
| Comparative Example 18 | 1000 | Polymer H | 800 | 64.2 | 30.4 | 3298 |
| Comparative Example 19 | 1000 | Polymer I | 800 | 68.8 | 39.8 | 2821 |
| Comparative Example 20 | 1000 | Polymer J | 200 | 66.1 | 35.0 | 3384 |
| Comparative Example 21 | 1000 | Polymer J | 400 | 71.0 | 45.3 | 1917 |
| Comparative Example 22 | 1000 | Polymer J | 800 | 77.4 | 58.5 | 361 |
| Blank 4 | 0 | No addition | | 60.4 | 11.0 | 948 |
| Comparative Example 23 | 0 | Polymer A | 800 | 62.4 | 18.5 | 693 |
| Comparative Example 24 | 0 | Polymer B | 800 | 63.2 | 20.6 | 826 |
| Comparative Example 25 | 0 | Polymer C | 800 | 64.7 | 25.2 | 725 |
| Comparative Example 26 | 0 | Polymer D | 200 | 63.8 | 20.5 | 696 |
| Comparative Example 27 | 0 | Polymer D | 400 | 63.2 | 20.0 | 438 |
| Comparative Example 28 | 0 | Polymer D | 800 | 64.1 | 22.3 | 371 |
| Comparative Example 29 | 0 | Polymer E | 800 | 62.6 | 19.4 | 462 |
| Comparative Example 30 | 0 | Polymer F | 800 | 61.5 | 16.2 | 529 |

TABLE 4

| | Amount of starch added (mg/L relative to slurry) | Polymer Type | Polymer Amount added (g/t relative to SS) | SS yield ratio (%) | Ash yield ratio (%) | Filtrate turbidity (NTU) |
|---|---|---|---|---|---|---|
| Blank 5 | 0 | No addition | | 60.4 | 11.0 | 948 |
| Comparative Example 31 | 0 | Polymer A | 400 | 63.2 | 20.0 | 438 |
| Blank 6 | 5 | No addition | | 60.5 | 11.3 | 887 |
| Comparative Example 32 | 5 | Polymer A | 400 | 61.2 | 18.9 | 779 |
| Blank 7 | 10 | No addition | | 59.8 | 10.5 | 926 |
| Example 17 | 10 | Polymer A | 400 | 65.8 | 24.2 | 262 |
| Blank 8 | 20 | No addition | | 60.0 | 10.6 | 932 |
| Example 18 | 20 | Polymer A | 400 | 67.9 | 32.3 | 222 |
| Blank 9 | 50 | No addition | | 60.2 | 10.9 | 842 |
| Example 19 | 50 | Polymer A | 400 | 70.0 | 37.3 | 192 |
| Blank 10 | 100 | No addition | | 59.6 | 10.5 | 817 |
| Example 20 | 100 | Polymer A | 400 | 71.2 | 39.8 | 188 |
| Blank 11 | 200 | No addition | | 60.8 | 14.8 | 1449 |
| Example 21 | 200 | Polymer A | 400 | 80.3 | 59.5 | 30 |
| Blank 12 | 500 | No addition | | 62.2 | 19.8 | 2673 |
| Example 22 | 500 | Polymer A | 400 | 85.5 | 71.3 | 20 |
| Blank 13 | 1000 | No addition | | 63.5 | 27.3 | 5387 |
| Example 23 | 1000 | Polymer A | 400 | 89.3 | 80.0 | 11 |

The results with addition of no polymer and with addition of 400 g/t of polymer A relative to SS were compared in each amount of starch added. As shown in Table 4, in the case where polymer A was added, both yield effect and fixation effect were higher in Examples 17 to 23 in which the amounts of starch added were 10 mg/L or more. It is considered that, when the unfixed starch concentration is 10 mg/L or more, the polymer having a polyalkylene oxide moiety can exert the effect caused by insolubilization of the starch.

<Test Example 4> Relation Between Concentration of Suspended Solid Contained in Papermaking Process Water (SS) and Fixing Properties of Unfixed Starch to Suspended Solid (SS)

While stirring a dispersion that was adjusted so that hardwood kraft pulp (LBKP) refined to 200 mL Canadian Standard Freeness (CSF) and the above light calcium carbonate may be 1:1 by absolute dry weight and the total concentration of the suspended solid (SS) may be the value shown in Table 5, starch and a starch insolubilizing agent were sequentially added thereto. As the starch, 200 mg/L of the same starch as in Test Example 1 was added as a solid matter relative to the dispersion. As the starch insolubilizing agent, 10 mL/g of polymer A shown in Table 1 was added thereto relative to the dispersion.

The amount of the unfixed starch was measured in a similar manner as in Test Example 1 for samples after the sequential addition of the starch and the starch insolubilizing agent. The results are shown in Table 5.

TABLE 5

| | Dispersion concentration (mg/L) | Polymer Type | Polymer Amount added (mg/L) | Unfixed starch concentration (mg/L) |
|---|---|---|---|---|
| Blank 14 | 0 | No addition | | 200 |
| Comparative Example 33 | 0 | Polymer A | 10 | 198 |
| Blank 15 | 50 | No addition | | 188 |
| Comparative Example 34 | 50 | Polymer A | 10 | 190 |
| Blank 16 | 100 | No addition | | 175 |
| Example 24 | 100 | Polymer A | 10 | 125 |
| Blank 17 | 200 | No addition | | 160 |
| Example 25 | 200 | Polymer A | 10 | 95 |
| Blank 18 | 500 | No addition | | 152 |
| Example 26 | 500 | Polymer A | 10 | 76 |
| Blank 19 | 1000 | No addition | | 144 |
| Example 27 | 1000 | Polymer A | 10 | 68 |

As shown in Table 5, in the case where polymer A was added, the unfixed starch concentration was lowered in Examples 24 to 27 in which the dispersion concentrations were 100 mg/L or more. If the polymer having a polyalkylene oxide moiety could insolubilize the starch, the suspended solid (SS) which is a fixed object of the insolubilized starch obtained through insolubilization is required, and the required amount thereof is considered to be 100 mg/L or more.

The invention claimed is:

1. A method for producing paper comprising a step of adding a polymer having a polyalkylene oxide moiety to papermaking process water containing a suspended solid containing a papermaking raw material and unfixed starch,
   wherein a proportion of the polyalkylene oxide moiety contained in the polymer is 50% by weight or more relative to the total polymer,
   a concentration of the suspended solid contained in the papermaking process water is 100 mg/L or more,
   a concentration of the unfixed starch contained in the papermaking process water is 10 mg/L or more, and
   a salt viscosity of the polymer measured by the following method is 3 mPa·s or more, the viscosity of an aqueous solution containing 4% by weight of common salt and 0.5% by weight of the polymer is measured under the conditions of 25° C. and a rotor rotating speed of 60 rpm; the viscosity measurement method is based on JIS K 7117-2.

2. The method for producing paper according to claim 1, comprising a step of adding a slime control agent to the papermaking process water.

\* \* \* \* \*